United States Patent
Chu et al.

(10) Patent No.: US 10,085,140 B2
(45) Date of Patent: Sep. 25, 2018

(54) PREVENTING MOBILE COMMUNICATION DEVICE DATA LOSS

(75) Inventors: Jean Chu, Bloomfield, NJ (US); Susan L. Diamond, Poughkeepsie, NY (US); Peter B. Hom, Oakland Gardens, NY (US); Raghunandan Hulgundi, Highland, NY (US); Jenny S. Li, Danbury, CT (US); Jing-Na Yuan, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 240 days.

(21) Appl. No.: 13/549,120

(22) Filed: Jul. 13, 2012

(65) Prior Publication Data
US 2014/0019418 A1    Jan. 16, 2014

(51) Int. Cl.
| G06F 11/30 | (2006.01) |
| H04W 4/90 | (2018.01) |
| G06F 11/14 | (2006.01) |
| H04M 1/725 | (2006.01) |
| G06F 11/00 | (2006.01) |

(52) U.S. Cl.
CPC .......... *H04W 4/90* (2018.02); *G06F 11/1461* (2013.01); *H04M 1/72522* (2013.01); *G06F 11/008* (2013.01); *G06F 2201/86* (2013.01); *H04M 2250/12* (2013.01)

(58) Field of Classification Search
CPC .. G06F 11/1461; G06F 11/1458; G06F 1/206; G06F 11/1456; G06F 11/3058; G06F 11/1446; G06F 2201/81; G06F 11/3072; G06F 11/3447; G06F 11/3409; G06F 2201/86; G06F 11/008; H04M 2250/12

USPC .................................................... 714/E11.124
See application file for complete search history.

(56) References Cited

U.S. PATENT DOCUMENTS

| 4,937,763 | A  | * | 6/1990  | Mott ............................. 702/183 |
| 6,442,511 | B1 | * | 8/2002  | Sarangapani et al. ........ 702/194 |
| 6,460,005 | B1 | * | 10/2002 | Chang ................. G06F 11/3058 |
|           |    |   |         |                           702/130 |
| 6,496,949 | B1 | * | 12/2002 | Kanevsky et al. ........... 714/47.1 |

(Continued)

FOREIGN PATENT DOCUMENTS

| CN | 1870789 A | 11/2006 |
| JP | 2001236258 A | * 8/2001 |
| WO | WO 2014065803 A1 | * 5/2014 |

OTHER PUBLICATIONS

Apple suggests best temperature range for the iPhone, http://www.phonearena.com/news/Apple-suggests-best-temperature-range-for-the-iPhone_jd5821, pp. 1-2 (2009).

(Continued)

*Primary Examiner* — Taelor Kim
*Assistant Examiner* — Jesse P Frumkin
(74) *Attorney, Agent, or Firm* — Cantor Colburn LLP; William A. Kinnaman, Jr.

(57) ABSTRACT

A mobile communication device includes a temperature sensor configured to sense a temperature and a control unit configured to determine whether a change in the sensed temperature relative to a previously-sensed temperature corresponds to a critical time range. The control unit is also configured to store data in a data storage unit when it is determined that the change in the sensed temperature corresponds to the critical time range.

19 Claims, 5 Drawing Sheets

(56) References Cited

U.S. PATENT DOCUMENTS

| | | | | |
|---|---|---|---|---|
| 7,171,186 | B2* | 1/2007 | Miyachi | H04M 1/72519 320/134 |
| 8,484,464 | B2* | 7/2013 | Brown et al. | 713/165 |
| 8,583,601 | B1* | 11/2013 | Claudatos | G06F 11/1461 707/640 |
| 8,909,383 | B2* | 12/2014 | Hadderman et al. | 700/299 |
| 2003/0097234 | A1* | 5/2003 | Tanabe | G06F 1/206 702/130 |
| 2004/0014489 | A1 | 1/2004 | Miyachi et al. | |
| 2004/0068386 | A1* | 4/2004 | Smith | G06F 11/1441 702/132 |
| 2004/0262409 | A1* | 12/2004 | Crippen et al. | 236/49.3 |
| 2005/0140510 | A1* | 6/2005 | Elwood | G06F 11/3058 340/540 |
| 2006/0217940 | A1* | 9/2006 | Cascaval | G06F 1/206 702/196 |
| 2007/0136541 | A1* | 6/2007 | Herz et al. | 711/162 |
| 2007/0156506 | A1* | 7/2007 | Hara | 705/10 |
| 2007/0225871 | A1* | 9/2007 | Karstens | 700/299 |
| 2008/0027998 | A1* | 1/2008 | Hara | 707/200 |
| 2008/0183774 | A1* | 7/2008 | Otani et al. | 707/204 |
| 2009/0290625 | A1* | 11/2009 | Riddle et al. | 375/222 |
| 2010/0306598 | A1* | 12/2010 | Ackaret | G06F 11/073 714/47.1 |
| 2010/0332190 | A1* | 12/2010 | Yamaguchi | H04L 67/12 702/187 |
| 2011/0273378 | A1 | 11/2011 | Alameh et al. | |
| 2011/0301778 | A1 | 12/2011 | Liang et al. | |
| 2012/0084032 | A1* | 4/2012 | McHardy et al. | 702/63 |
| 2013/0013126 | A1* | 1/2013 | Salsbery et al. | 700/299 |
| 2013/0060510 | A1* | 3/2013 | Cox et al. | 702/130 |
| 2013/0103900 | A1* | 4/2013 | Chiu | G06F 11/004 711/112 |
| 2013/0345887 | A1* | 12/2013 | Govindan et al. | 700/291 |
| 2014/0031082 | A1* | 1/2014 | Zishaan | 455/556.1 |
| 2014/0089243 | A1* | 3/2014 | Oppenheimer | 706/46 |
| 2014/0298113 | A1* | 10/2014 | Sakurai | G06F 11/2025 714/47.3 |
| 2015/0236928 | A1* | 8/2015 | Drake | H04L 41/0816 709/224 |

OTHER PUBLICATIONS

BitPim—Manage data on CDMA phones from LG, Samsung, Sanyo and others, www.bitpim.org, pp. 1-6 (2012).

Gentag, RFID Temperature Sensor Tags—Passive Version (no battery) & Battery-Assisted Logger Versions, www.gentag.com/documents/GT301.pdf, p. 1 (2012).

Limpag, Leon Kilat—The Cybercafe Experiments, "Back Up Your Mobile Phone Data Online", http://max.limpag.com/article/back-up-your-mobile-phone-data-online/, pp. 1-5 (2006).

Mobyko: Backup Mobile Phone Data Online, http://www.makeuseof.com/dir/mobyko-manage-mobile-phone-online/, pp. 1-2 (2009).

NOKIA—Sustainable devices, http://www.nokia.com/environment/devices-and-services/devices-and-accessories/future-concepts/eco-sensor-concept, pp. 1-5 (2012).

* cited by examiner

PREVENTING MOBILE COMMUNICATION DEVICE DATA LOSS

BACKGROUND

The present invention relates generally to preventing mobile communication device data loss. In particular, the present invention relates to preventing mobile communication device data loss due to climate changes such as temperature change.

With the advancement and increased functionality of smart phones and smart phone applications, more users are storing more data in their cell phones. For example, users store pictures, contact information, documents, passwords, applications, web browser information, and other data including important business or personal data. Many cell phones have particular temperature ranges of operation, and components of the cell phone may be damaged when the cell phone is in an environment having a temperature outside the range of operation.

SUMMARY

An exemplary embodiment is a mobile communication device including a temperature sensor configured to sense a temperature and a control unit configured to determine whether a change in the sensed temperature relative to a previously-sensed temperature corresponds to a critical time range and configured to store data in data storage unit when it is determined that the change in the sensed temperature corresponds to the critical time range.

Another exemplary embodiment is a system comprising a mobile communication device temperature monitoring assembly configured to monitor a temperature of an environment around a mobile communication device and a data storage control assembly configured to determine whether a change in the monitored temperature corresponds to a critical time range and configured to back up the data stored in the mobile communication device based on determining that the monitored temperature corresponds to the critical time range.

A further exemplary embodiment is a method comprising sensing a temperature in an environment around a mobile communication device, calculating a change in sensed temperature using a previously-sensed temperature, extrapolating from the change in sensed temperature a time at which a critical temperature will be reached, and backing up data from the mobile communication device based on determining that the time at which a critical temperature will be reached is within a critical time range.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments of the present invention provide apparatuses, systems, and methods for protecting personal mobile communication devices, such as cell phones, personal data assistants (PDA's), and other personal communication devices, from data loss due to extreme climate conditions.

Figure 1:
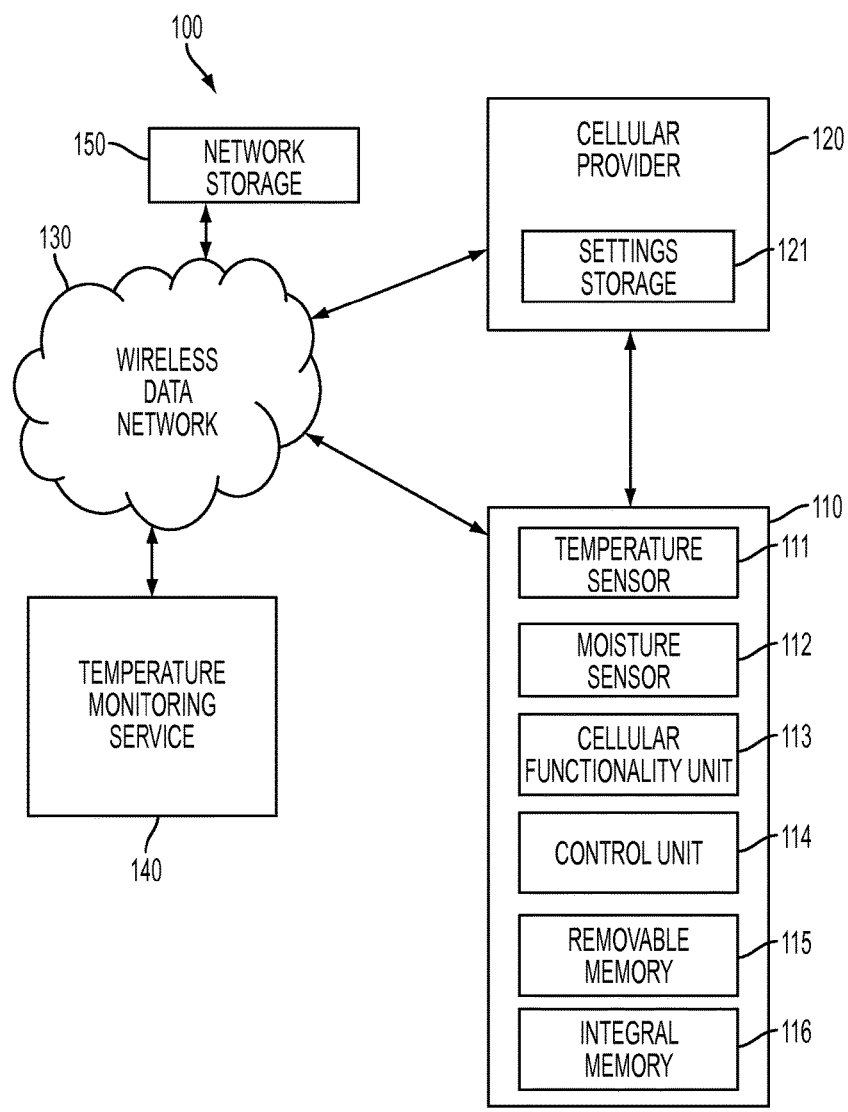
FIG. 1 depicts a data loss prevention system according to one embodiment.

FIG. 1 depicts a data loss prevention system 100 according to one embodiment. The data loss prevention system 100 includes a mobile communication device 110 and a cellular provider 120. The mobile communication device 110 may be, for example, a cell phone or PDA. However, embodiments of the present disclosure encompass other types of personal mobile communication devices, such as tablet computers, laptops, image recorders, or other mobile communication devices. The mobile communication device 110 may be a personal mobile communication device, or a device designed to be used by one person at a time and configurable to suit the needs of a user. For example, in one embodiment, the mobile communication device 110 may be a cell phone, and a user may store personal and business images, emails, videos, calendars, documents, and other data in the cell phone.

The mobile communication device 110 includes a temperature sensor 111 to detect a temperature of an environment around the mobile communication device 110, such as outside the casing of the mobile communication device 110. The mobile communication device 110 also includes a cellular functionality unit 113 including a cellular transmitter/receiver and supporting circuitry to enable a user to transmit and receive data and telephone calls via a cellular network.

The mobile communication device 110 may include integral memory 116, such as flash memory or other memory chips integrated into the circuit boards of the mobile communication device 110. The integral memory 116 may include volatile memory, such as random-access memory, and non-volatile memory. The mobile communication device 110 may also include removable memory 115, such as a memory card that is insertable into a slot in the casing of the mobile communication device 110, electrically connectable with contacts of the mobile communication device 110 to provide data storage, and removable from the slot in the casing of the mobile communication device 110.

The mobile communication device 110 includes a control unit 114. The control unit 114 monitors temperature information from the temperature sensor 111, calculates a critical time range corresponding to a time necessary to back up a predetermined amount of data based on the monitored temperature information, and initiates a data backup when the critical time range is reached. The control unit 114 may include a processor and memory, such as cache memory, as well as supporting circuitry, such as logic circuitry.

The mobile communication device 110 may further include a moisture sensor 112, and the control unit 114 may initiate the data backup when a critical moisture level is reached, or when a combination of a critical moisture level and a critical time range are reached.

The cellular provider 120 may include servers storing data corresponding to the mobile communication device 110. For example, the cellular provider 120 may have settings storage 121 to store backup settings set by a user or default settings provided by the cellular provider or the mobile communication device 110 manufacturer. A user may transmit backup settings from the mobile communication device 110 to the cellular provider 120, via the wireless data network 130, such as via a website, or by any other means. The backup settings may include priority settings, such as establishing a priority as to what types of data, which files, or which program data is backed up first, how much data should be backed up, how often data should be backed up, and other backup settings.

For example, in one embodiment, a user may provide settings establishing photos be backed up first, then documents, then emails. In another embodiment, a user may provide settings that up to a certain level of data is to be backed up, such as 5 MB, 50 MB, 1 GB, or any other level of data, depending upon a device data storage capacity, data transmission speed, or other factors.

In one embodiment, the settings include a setting to back up data in the mobile communication device 100 at regular intervals. When the control unit 114 of the mobile communication device 100 detects an event causing a data backup at a time other than at the regular intervals, such as a rapid increase in temperature outside the mobile communication device 110, the control unit 114 may initiate an immediate backup request to the cellular provider system 120. The control unit 114 may back up only the portions of data stored in the mobile communication device 110 that have changed since the last regularly scheduled backup. The control unit 114 may determine the backup locations of the data based on the priority settings by a user. The control unit 114 may back up a portion of the data from an integral memory 116 to removable memory 115 and a portion of the data from the wireless device memory to a storage external to the wireless device.

The mobile communication device 110 may also include a moisture sensor 112 to detect a moisture level around the mobile communication device 110 or inside the mobile communication device. The control unit 114 may analyze the moisture level detected by the moisture sensor 112 and may back up data of the mobile communication device according to the detected moisture level.

For example, in one embodiment, the control unit 114 may initiate a backup of data when the moisture level increases past a predetermined threshold level. In another embodiment, the control unit 114 may adjust a critical time range corresponding to the temperature sensor 111 based on the detected moisture level. For example, if the critical time range is set at thirty seconds when the moisture level is at a first low level, the control unit 114 may adjust the critical time range to be forty-five seconds when the moisture level is at a second high level. In other words, an increase in the moisture level may cause the control unit 114 to initiate a backup of data at a lower temperature than when the moisture level is at a low level.

In some embodiments of the present disclosure, the data loss prevention system 100 may include a wireless data network 130, such as a Wi-Fi network, a temperature monitoring service 140, and a network storage 150. In one embodiment, the temperature sensor 111 or the moisture sensor 112 may be omitted from the mobile communication device 110, and instead a temperature monitoring service 140 may provide data regarding the temperature and/or moisture at a location corresponding to the location of the mobile communication device 110. For example, the cellular provider 120 may receive location data from the mobile communication device, such as global positioning system (GPS) data, or other geographic location data, and may obtain data regarding temperature and other climate conditions at a location corresponding to the location of the mobile communication device 110 from the temperature monitoring service 140. Examples of temperature monitoring services 140 may include companies or organizations that maintain weather or climate websites, databases, or otherwise store climate data.

The cellular provider 120 may receive the climate data, such as temperature data, from the temperature monitoring service 140 and may initiate a data backup of the mobile communication device 110. In one embodiment, the data from the mobile communication device 110 is stored in one of the removable memory 115 and the integral memory 116 of the mobile communication device 110. In another embodiment, the data from the mobile communication device 110 is stored in the network storage 150 external to the mobile communication device 110.

Accordingly, embodiments of the present disclosure encompass a mobile communication device 110 that initiates a data backup operation based on a predicted temperature, moisture, or other climate condition, and backs up data according to predetermined priority settings. Embodiments of the present disclosure further encompass devices, assemblies, and services external to the mobile communication device 110 initiating the backup of the mobile communication device 110.

Figure 2:
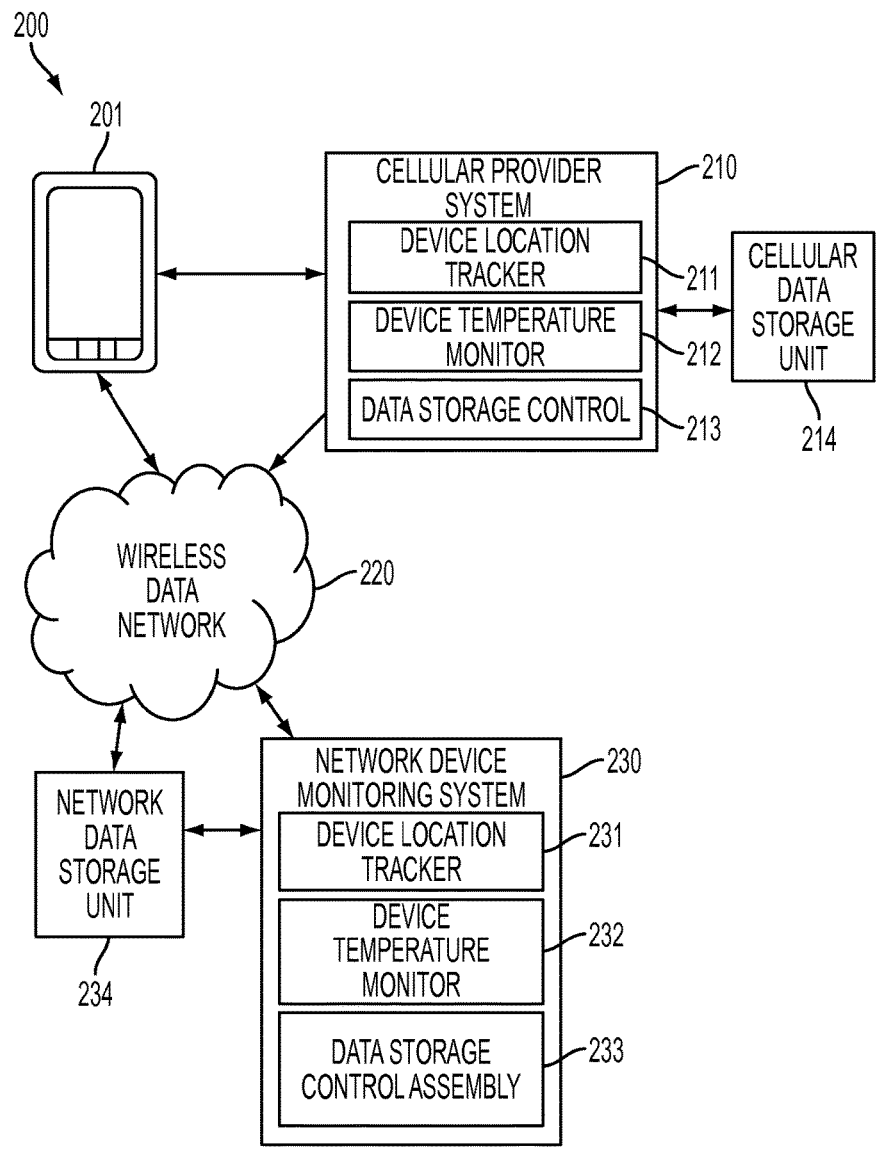
FIG. 2 depicts a data loss prevention system according to another embodiment.

FIG. 2 illustrates a data loss prevention system 200 according to another embodiment of the present disclosure. The data loss prevention system 200 includes a mobile communication device 201, which may correspond to the mobile communication device 110 of FIG. 1. The data loss prevention system 200 further includes a cellular provider system 210 and a network device monitoring system 230. The cellular provider system 210 may include a device location tracker 211 to monitor a location of the mobile communication device 201, a device temperature monitor 212 to monitor the temperature of the mobile communication device 201, and a data storage control assembly 213 to control data storage operations of the mobile communication device 201.

The device location tracker 211 may receive location data from the mobile communication device 201 by a geographic location tracking system, such as by a GPS or other location tracking system. The device temperature monitor 212 may monitor a temperature of the mobile communication device 201 or of the environment around the mobile communication device 201 by receiving temperature data from the mobile communication device 201 or by receiving temperature or other climate data from weather or climate services, websites, or databases that track the weather or climate in different geographical locations.

The data storage control assembly 213 may determine whether the sensed climate condition meets a predetermined criterion, and may initiate a data backup of the mobile communication device 201 based on the predetermined criterion. For example, the data storage control assembly 213 may determine whether a predicted time at which a temperature of the mobile communication device 201 will exceed a predetermined temperature is within a calculated critical time range and may initiate a data backup of the mobile communication device 201 when the predicted time is within the critical time range.

In embodiments of the present disclosure, the data storage control assembly 213 may control the mobile communication device 201 to initiate the data backup to a memory location within the mobile communication device 201 or to a memory location external to the mobile communication device 201. For example, the data storage control assembly 213 may back up data from the mobile communication device 201 to a cellular data storage unit 214.

The data storage control assembly 213 may further store backup settings data provided by a user, as default settings provided by the cellular provider, or by a manufacturer of the mobile communication device 201. The backup settings may include priority data regarding types of data or files that are to receive priority in a backup operation, amounts of data to be backed up, or any other backup settings.

In embodiments of the present disclosure, each of the device location tracker 211, device temperature monitor 212, and data storage control assembly 213 may include one or more processors, memory, supporting logic, and other circuitry to transmit and receive data, process data, compare data values to predetermined threshold values, predict data values, and perform any other functions required by the cellular provider system 210. Embodiments of the present disclosure further encompass software stored in memory and executed by a processor to perform the above-described operations of the device location tracker 211, device temperature monitor 212, and data storage control assembly 213.

In other embodiments of the present disclosure, a network device monitoring system 230 may perform the processes and operations described above with respect to the cellular provider system 210. In particular, the network device monitoring system 230 may communicate with the mobile communication device 201 via a wireless data network 220, such as a Wi-Fi network and may include a device location tracker 231 to monitor a location of the mobile communication device 201, a device temperature monitor 232 to monitor the temperature of the mobile communication device 201, and a data storage control assembly 233 to control data storage operations of the mobile communication device 201.

The device location tracker 231 may receive location data from the mobile communication device 201 by a geographic location tracking system, such as by a GPS or other location tracking system. The device temperature monitor 232 may monitor a temperature of the mobile communication device 201 or of the environment around the mobile communication device 201 by receiving temperature data from the mobile communication device 201 or by receiving temperature or other climate data from weather or climate services, websites, or databases that track the weather or climate in different geographical locations.

The data storage control assembly 233 may determine whether a predetermined criterion is met, and may initiate a data backup of the mobile communication device 201 based on the predetermined criterion. For example, the data storage control assembly 233 may determine whether a predicted time at which a temperature of the mobile communication device 201 will exceed a predetermined temperature is within a calculated critical time range and may initiate a data backup of the mobile communication device 201 when the predicted time is within the critical time range.

In embodiments of the present disclosure, the data storage control assembly 233 may control the mobile communication device 201 to initiate the data backup to a memory location within the mobile communication device 201 or to a memory location external to the mobile communication device 201. For example, the data storage control assembly 233 may back up data from the mobile communication device 201 to a network data storage unit 234.

The data storage control assembly 233 may further store backup settings data provided by a user, as default settings provided by the cellular provider, or by a manufacturer of the mobile communication device 201. The backup settings may include priority data regarding types of data or files that are to receive priority in a backup operation, amounts of data to be backed up, or any other backup settings.

In embodiments of the present disclosure, each of the device location tracker 231, device temperature monitor 232, and data storage control assembly 233 may include one or more processors, memory, supporting logic, and other circuitry to transmit and receive data, process data, compare data values to predetermined threshold values, predict data values, and perform any other functions required by the network device monitoring system 230. Embodiments of the present disclosure further encompass software stored in memory and executed by a processor to perform the above-described operations of the device location tracker 231, device temperature monitor 232, and data storage control assembly 233.

Figure 3:
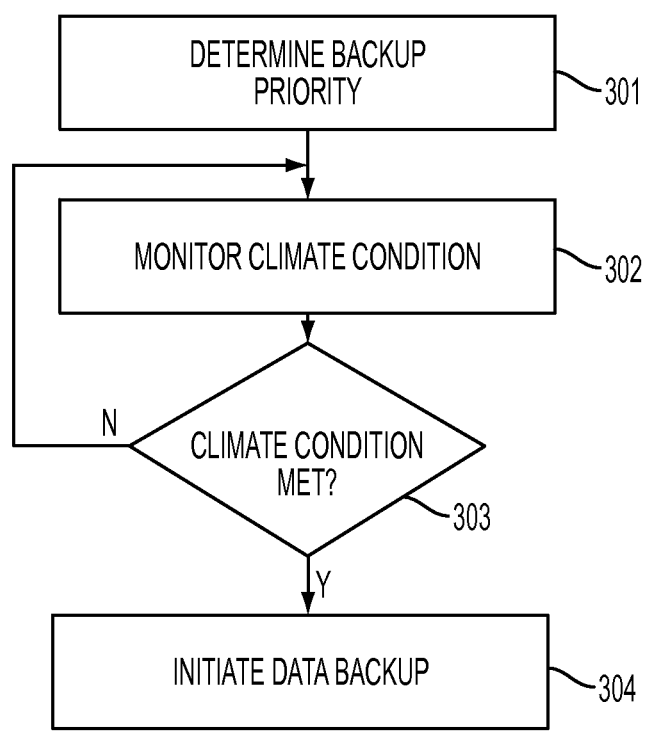
FIG. 3 depicts a method of initiating a data backup according to one embodiment.

FIG. 3 depicts a method of initiating a data backup according to one embodiment. In block 301 a backup priority is determined. For example, backup priority settings may be stored in a mobile communication device, with a cellular provider in communication with the mobile communication device, or with another wireless network provider in communication with the mobile communication device. The backup priority may be set by a user or may be default settings provided by a cellular provider or manufacturer.

In one embodiment, backup priority settings include establishing a backup priority among types of files, such as image files, word processing files, application data files, music files, other media files, and other document files. Backup priority may also be based upon a creator, sender, or receiver of a file or program. Backup priority may also be based on a time at which a file or program was created or modified. In one embodiment, backup priority settings are configurable by a user via the mobile communication device, via a cellular service provider website, or via another website, such as a data backup service website.

In block 302, a climate condition is monitored. In one embodiment, the climate condition is a temperature of a mobile communication device or in the environment around the mobile communication device. In another embodiment, the climate condition is a moisture level in or around the mobile communication device. In yet another embodiment, the climate condition includes two or more climate conditions, such as both the temperature and moisture level in or around the mobile communication device. Although temperature and moisture level are provided as examples of monitored climate conditions, embodiments of the present disclosure encompass any climate conditions.

In block 303, it is determined whether the climate condition meets a predetermined criterion for initiating backup. For example, in one embodiment, it may be determined whether a sensed temperature corresponds to a threshold temperature, or whether a predicted time for a temperature to reach the threshold temperature is within a critical time period. In another embodiment, the predicted time and the moisture level are both used to determine the critical time period.

If the predetermined criterion is not met, then the climate condition is continually monitored in operation 302. On the other hand, if the predetermined criterion is met, then in block 304 a data backup of the mobile communication device is initiated.

Figure 4:
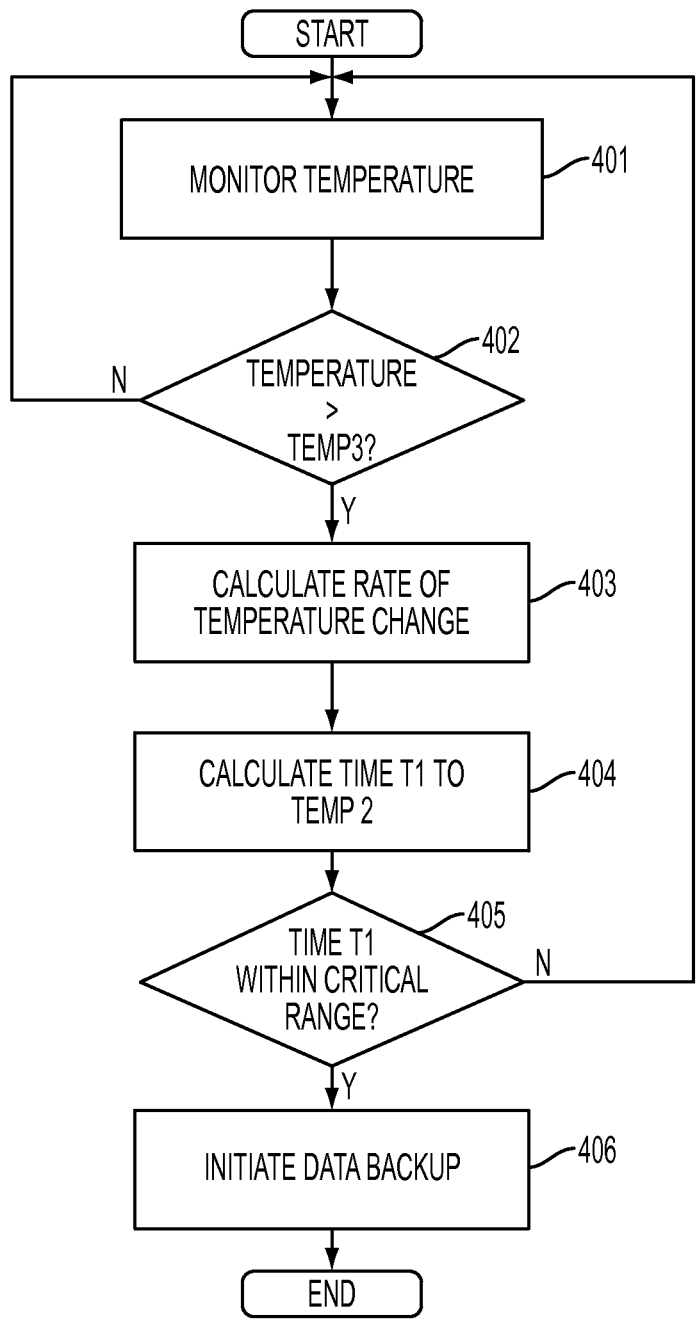
FIG. 4 depicts a method of initiating a data backup according to an embodiment.

FIG. 4 depicts a method of initiating a data backup according to one embodiment. In block 401, a temperature of a mobile communication device is monitored. In operation 402, it may be determined whether the detected temperature is greater than a threshold temperature temp3. For example, the threshold temperature temp3 may be a trigger temperature beyond which a backup operation may be performed when certain additional criteria are met. However, in alternative embodiments block 402 is omitted, and the method proceeds directly from block 401 to block 403.

In block 403 a rate of change of the temperature is calculated. In block 404, a time T1 is calculated, based on the rate of change of the temperature, that the temperature will reach a threshold temperature temp2. In one embodiment, temp2 defines an operating temperature limit of the mobile communication device. For example, temp2 may be a temperature provided by the manufacturer to indicate a threshold temperature beyond which damage to the mobile communication device may occur, resulting in lost data in the mobile communication device.

In one embodiment, the time T1 is calculated by extrapolating from the rate of change in previously-sensed temperatures a rate at which the temperatures may be expected to change in the future. Based on the extrapolated future rate of change, the time T1 may be determined at which the sensed temperature may be expected to reach the threshold temperature temp2.

In block 405, it is determined whether the time T1 is within a critical time range. In one embodiment, the critical time range is a duration of time in which a backup operation may be performed. In some embodiments, the critical time range may include the time necessary to perform the backup plus a duration between temperature detection intervals. In still other embodiments, a buffer period of time may be provided to the critical period of time to account for changing temperatures at rates that exceed previously-sensed temperatures.

The critical time range may be adjusted according to climate conditions. For example, in one embodiment, the critical time range may be increased when a high moisture level is detected. For example, the critical time range may be set at thirty seconds when a low moisture level is detected, so that a backup will be initiated when the extrapolated time T1 is less than or equal to thirty seconds. However, if the moisture level is high, data storage and communication capabilities of the mobile communication device may be damaged sooner than when the moisture levels are low. Accordingly, the critical time range may be increased so that the data backup is triggered sooner when a high moisture level is detected than when a low moisture level is detected.

In block 406, when it is determined that the time T1 is within the critical time range, a data backup of the mobile communication device may be initiated.

Figure 5A:
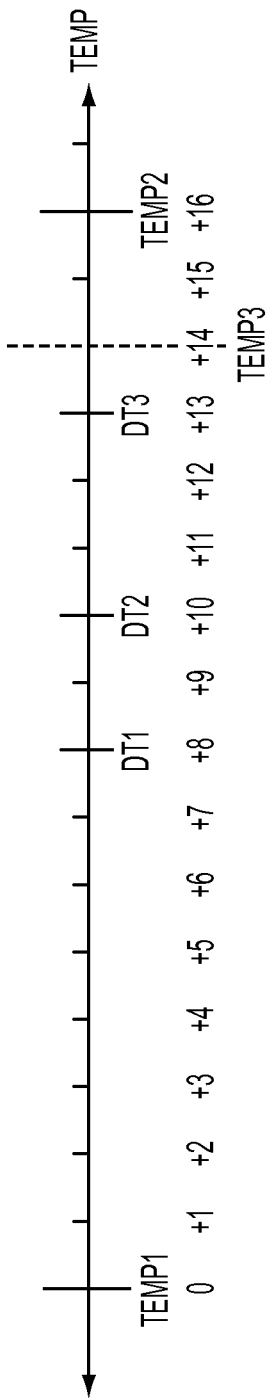
FIGS. 5A and 5B illustrate temperature detection signals according to one embodiment.
Figure 5B:
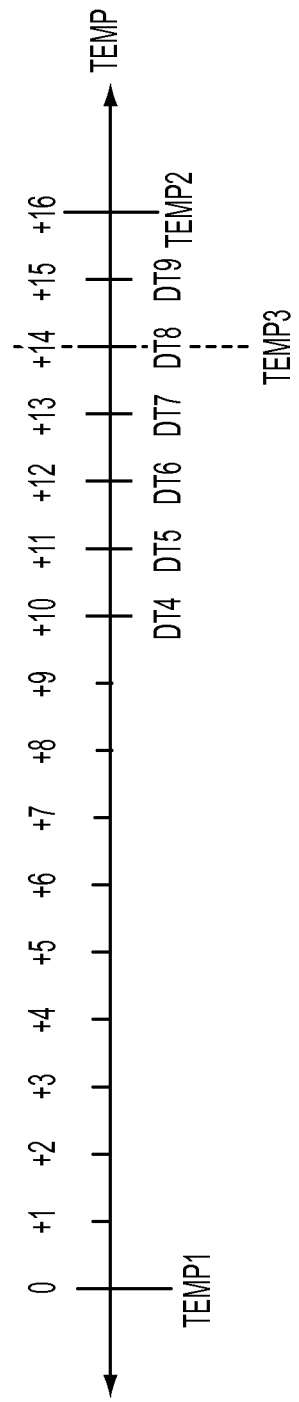

FIGS. 5A and 5B illustrate temperature detection signals according to embodiments of the present disclosure. In particular, FIGS. 5A and 5B illustrate the correlation between detected temperatures and a critical time range, where the horizontal axes in FIGS. 5A and 5B correspond to temperature. In FIGS. 5A and 5B, DT represents a detected temperature, and each subsequent temperature detection is performed at an equal time interval from a previous temperature detection. For purposes of explanation only, and by way of example, the time period between temperature detections DT is one minute, and the critical time period is also one minute. For example, it may be determined that thirty seconds are needed to perform a backup operation, and an additional thirty seconds may be provided as buffer time to account for a rapid increase in temperature between temperature detection periods.

As illustrated in FIGS. 5A and 5B, a first temperature threshold temp1 defines a lower operation limit of a mobile communication device and a second temperature threshold temp2 defines an upper operation limit of a mobile communication device. A third temperature threshold temp3 may be provided as a trigger to allow for performing a data backup, may trigger automatic data backups, or may be omitted from consideration.

In FIG. 5A, a first temperature detection DT1 detects a temperature of +8, and a second temperature detection DT2 detects a temperature of +10. A change in temperature of 2 may be calculated, and it may be determined that a time to reach the second threshold temperature temp2 based on the rate of change of 2 is beyond the critical time range. In other words, it may be calculated that a next temperature would be detected at +12 in one minute, at +14 in two minutes, and at +16 in three minutes. Since the critical time threshold is set at one minute, and the time T1 at which it may be extrapolated that the temperature would reach the second threshold temperature T2 is three minutes, no data backup may be performed.

A third temperature detection DT3 detects a temperature of +13, and a difference of 3 is calculated. By extrapolating the rate of temperature change, it may be determined that the next temperature would be detected at +16. Since the calculated rate of change of 3 results in a next temperature being detected within the critical time range of one minute, or since the temperature may be expected to reach the second threshold temp2 within one minute, the backup of data from the mobile communication device may be initiated.

FIG. 5B illustrates an example in which a temperature is detected at a same absolute value (+13) as in FIG. 5A, but in which no data backup is triggered at the absolute value because the rate of change in FIG. 5B is less than in FIG. 5A. In particular, in FIG. 5B, detected temperatures DT4-DT7 correspond to one degree intervals in the range of +10 to +13. In other words, the calculated change between any two detected temperatures DT is 1. Since the second threshold temp2 would not be reached within the critical time period of one minute, no data backup is triggered by any of the detected temperatures DT4-DT7.

Since the detected temperature DT8 corresponds to the third threshold temperature temp3, a data backup may be triggered according to some embodiments, even though the calculated change in temperature still does not correspond to the critical time range of one minute. In embodiments in which the third threshold temperature temp3 does not trigger a data backup, the detected temperature DT9 triggers the data backup, since the difference between DT9 and DT8 is one degree, or in other words the rate of temperature increase is one degree per minute, and the second threshold temperature temp2 is at +16 degrees. Accordingly, the next temperature detected, one minute after the detected temperature DT9, could be expected to be at +16 degrees, or the second threshold temperature temp2.

The flowchart and block diagrams in the Figures illustrate the architecture, functionality, and operation of possible implementations of systems and methods according to various embodiments of the present invention. The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A mobile communication device comprising:
   a temperature sensor configured to generate a mobile communication device sensed temperature by sensing a temperature from the mobile communication device; and
   a control unit configured to determine a change over time in the mobile device sensed temperature relative to a previously-sensed mobile device sensed temperature, calculate a time range based on the change in the mobile device sensed temperature, compare the calculated time range to a critical time range and store data in a data storage unit when it is determined that the calculated time range is within the critical time range;
   wherein the critical time range comprises a predicted range of time until the mobile device sensed temperature is outside an operating range of the mobile communication device;
   wherein the operating range defines a range of temperatures in which the mobile communication device is designed to operate without failure due to temperature.

2. The mobile communication device of claim 1, further comprising:
   the data storage unit,
   wherein the control unit is configured to store data in the data storage unit based on the determining that the calculated time range is within the critical time range.

3. The mobile communication device of claim 1, wherein the control unit is configured to notify a communications service provider to initiate an emergency backup based on the determining that the calculated time range is within the critical time range.

4. The mobile communication device of claim 1, further comprising:
   a wireless transmitter,
   wherein the control unit is configured to transmit the data via the wireless transmitter to the data storage unit external to the mobile communication device based on the determining that the calculated time range is within the critical time range.

5. The mobile communication device of claim 1, wherein the data comprises predetermined categories of data having been selected by a user prior to the determining that the calculated time range is within the critical time range.

6. The mobile communication device of claim 1, wherein the control unit stores the data in the storage unit according to a predetermined priority configurable by a user.

7. The mobile communication device of claim 1, wherein the calculated time range comprises a predicted period of time until a subsequently-sensed mobile device sensed temperature would be outside an operating range of the mobile communication device.

8. The mobile communication device of claim 1, further comprising:
   a moisture sensor configured to sense a moisture level,
   wherein the control unit is configured to determine whether the sensed moisture level corresponds to a critical moisture level and to store the data in the data storage unit based on determining that the sensed moisture level corresponds to the critical moisture level.

9. A system comprising:
   a mobile communication device temperature monitoring assembly configured to monitor an external mobile communication device temperature by monitoring a temperature of an environment around a mobile communication device; and
   a data storage control assembly configured to determine a change over time in the external mobile communication device temperature, calculate a time range based on the change in the external mobile communication device temperature, compare the calculated time range to a critical time range and back up the data stored in the mobile communication device based on determining that the calculated time range is within the critical time range.

10. The system of claim 9, wherein the data storage control assembly is configured to transmit the data from the mobile communication device to a storage assembly wirelessly connected to the mobile communication device.

11. The system of claim 9, wherein the temperature monitoring assembly is located externally from the mobile communication device.

12. The system of claim 9, wherein the data storage control assembly is configured to store a data backup priority and to back up the data stored in the mobile communication device according to the data backup priority.

13. The system of claim 12, wherein the data backup priority is configurable by a user via the mobile communication device.

14. The system of claim 9, wherein the data storage control assembly is configured to notify a communications service provider to initiate an emergency backup based on the determining that the calculated time range is within the critical time range.

15. A method comprising:
sensing, using a temperature monitor, a sensed temperature in an environment around a mobile communication device;
calculating a change over time in the sensed temperature using a previously-sensed version of the sensed temperature;
extrapolating from the change over time in the sensed temperature a time required to reach a critical temperature; and
backing up data from the mobile communication device based on determining that the time required to reach a critical temperature is within a critical time range.

16. The method of claim 15, further comprising:
sensing a moisture level in the environment around the mobile communication device; and
backing up the data from the mobile communication device based on determining that the sensed moisture level is above a threshold moisture level.

17. The method of claim 15, wherein the critical time range corresponds to a time required to back up the data prior to reaching the critical temperature.

18. The method of claim 15, wherein the critical temperature is a temperature defining a range of temperatures in which the mobile communication device is designed to operate without failure due to extreme temperature.

19. The method of claim 15, wherein backing up the data from the mobile communication device includes transmitting the data wirelessly from the mobile communication device to an external data storage device.

* * * * *